United States Patent
Lee

(10) Patent No.: US 9,168,870 B2
(45) Date of Patent: Oct. 27, 2015

(54) ROOM MIRROR MODULE FOR VEHICLE

(71) Applicant: LG INNOTEK CO., LTD., Seoul (KR)

(72) Inventor: Jae Kuk Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 40 days.

(21) Appl. No.: 14/010,049

(22) Filed: Aug. 26, 2013

(65) Prior Publication Data

US 2014/0055837 A1    Feb. 27, 2014

(51) Int. Cl.
| | |
|---|---|
| *G02F 1/15* | (2006.01) |
| *G02F 1/153* | (2006.01) |
| *B60R 1/02* | (2006.01) |
| *B60R 1/12* | (2006.01) |

(52) U.S. Cl.
CPC ... *B60R 1/02* (2013.01); *B60R 1/12* (2013.01); *B60R 2001/1215* (2013.01); *B60R 2001/1223* (2013.01); *B60R 2300/605* (2013.01)

(58) Field of Classification Search
CPC ............ A61B 71/0622; A63F 2300/105; G01C 9/06; B60R 2021/01095; B60R 21/01; G09G 2360/144
USPC ......................... 359/265, 267–274
See application file for complete search history.

(56) References Cited

U.S. PATENT DOCUMENTS

| | | | | |
|---|---|---|---|---|
| 5,640,274 | A  * | 6/1997 | Iwama et al. | 359/601 |
| 7,817,020 | B2 * | 10/2010 | Turnbull et al. | 340/438 |
| 2002/0014973 | A1 | 2/2002 | Drummond et al. | |
| 2003/0112631 | A1 * | 6/2003 | Brown | 362/465 |
| 2008/0180781 | A1 * | 7/2008 | Varaprasad et al. | 359/267 |
| 2008/0239527 | A1 * | 10/2008 | Okabe et al. | 359/843 |
| 2010/0023234 | A1 * | 1/2010 | Kameyama | 701/70 |
| 2011/0006886 | A1 * | 1/2011 | Park | 340/10.5 |
| 2012/0068979 | A1 * | 3/2012 | Chuang et al. | 345/207 |

FOREIGN PATENT DOCUMENTS

| | | |
|---|---|---|
| EP | 0788947 A1 | 8/1997 |
| KR | 20-0264726 Y1 | 2/2002 |
| KR | 10-2010-0019605 A | 2/2010 |
| KR | 10-2011-0127015 A | 11/2011 |
| WO | WO 2007/053710 A2 | 5/2007 |

OTHER PUBLICATIONS

Office Action dated Apr. 9, 2015 in European Application No. 13181758.7.

* cited by examiner

*Primary Examiner* — Mahidere Sahle
(74) *Attorney, Agent, or Firm* — Saliwanchik, Lloyd & Eisenschenk

(57) ABSTRACT

Provided is a room mirror module for a vehicle, including a control unit driving an electrochromic mirror and a display unit by discriminating the intensity of light and movement of the vehicle detected by a sensor unit, whereby the devices for the vehicle can be more efficiently controlled, and a driver's safe driving can be secured.

19 Claims, 3 Drawing Sheets

ROOM MIRROR MODULE FOR VEHICLE

CROSS-REFERENCE TO RELATED APPLICATION

This application claims the benefit under 35 U.S.C. §119 of Korean Patent Application No. 10-2012-0093729, filed Aug. 27, 2012, which is hereby incorporated by reference in its entirety.

BACKGROUND

1. Field of the Invention

Embodiments of the present invention relate to the technical field of a room mirror for a vehicle.

2. Description of the Related Arts

In general, various audiovisual alarm devices are installed in a vehicle as means for safe driving, but a separate alarm device, which gives a dangerous condition of a rear region of the vehicle that a driver's eye cannot see, is not installed, and mirrors are attached to various places in internal and external parts of the vehicle so that the driver can directly check conditions of the rear region of the vehicle.

Examples of these mirrors are a side mirror installed on the side of a door so as to observe the rear, and a room mirror installed at a frontal glass part of the interior of a vehicle so as to observe front and rear regions.

Although rear conditions can be catched up to a certain level by these mirrors, since regions which are not sufficient to check the rear conditions, namely, blind spots which cannot be seen by the mirror may be generated, this can cause safety accidents in a case where obstructions, which may be present in the blind spots, collide with a vehicle.

Accordingly, devices which call a driver's attention by generating warning sounds before obstructions come into contact with a vehicle, have been recently installed in the vehicle. That is, an obstruction alarm device and the like have been installed in the vehicle so that, when the obstructions approach the vehicle, the vehicle can be inhibited from a collision with the rear obstructions by informing the driver this condition. Furthermore, by installing a rear monitoring camera in the vehicle, namely, installing a monitor, which outputs an image signal so that the driver can confirm a captured rear image, in a room mirror, the driver can accurately check the rear condition when reversing the vehicle, or parking the vehicle in the rear, thereby trying to secure the driver's safety.

However, in a case where the rear image is displayed when the driver shifts into reverse gear, in the spite of the gear shift, if the sensor fails to detect it, the rear image may not be displayed.

Also, since it would be difficult to secure visual field or image information about a rotation direction of the vehicle upon turn right or left of the vehicle, it is problematic in that the risk of an accident increases.

BRIEF SUMMARY

Accordingly, embodiments of the present invention have been made keeping in mind the above problems occurring in the related art. An aspect of the present invention provides a room mirror module for a vehicle which can efficiently control the vehicle and can decreases the risk of an accident by linking an MEMS (micro-electro-mechanical system) sensor detecting movement with a photo sensor.

According to an aspect of the present invention, there is provided a room mirror module for a vehicle, including: a room mirror housing in which an electrochromic mirror is mounted on one surface; a sensor unit having a photo sensor detecting the intensity of light and an MEMS sensor detecting movement of the vehicle; the electrochromic mirror which changes reflectance depending on the intensity of light; a display unit disposed in a partial area of a rear surface of the electrochromic mirror and displaying an image received from a camera mounted to an external part of the vehicle; and a control unit driving the electrochromic mirror and the display unit by discriminating the intensity of light and the movement of the vehicle detected by the sensor unit.

According to the present invention, as the MEMS sensor detecting the movement of the vehicle and the photo sensor detecting the intensity of light are linked to each other, it is advantageous that the driving of the display unit, the electrochromic mirror and the headlight can be efficiently controlled.

Furthermore, since image information depending on a moving direction of the vehicle is displayed and the headlight is rotatable, the driver's field of vision can be wide, and the driver can rapidly and accurately respond to an unexpected situation or defensive driving, thereby reducing the risk of an accident.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION

Figure 1:
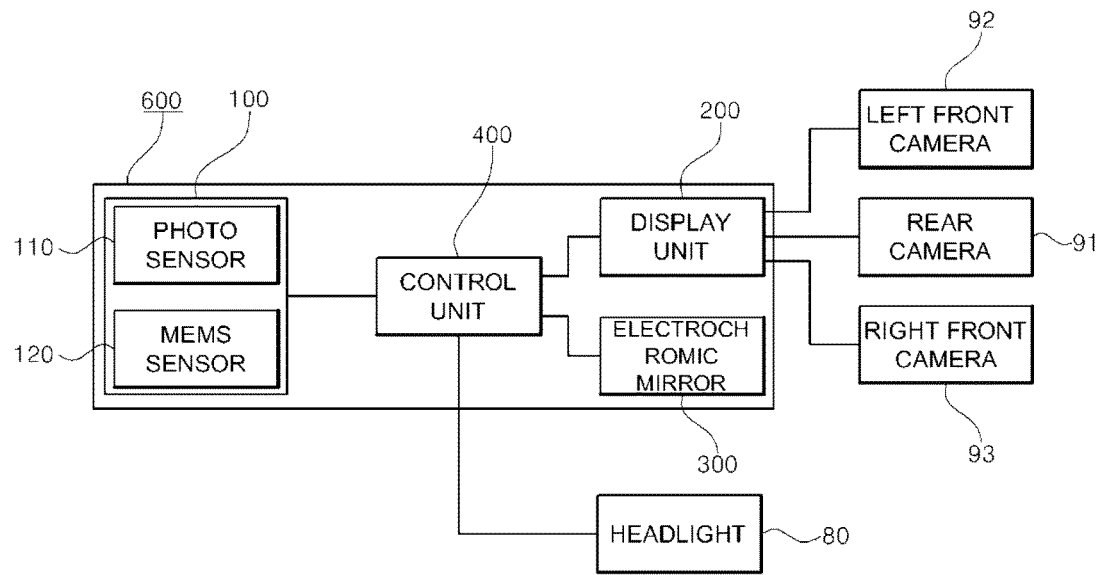
FIG. 1 is a block diagram illustrating a configuration of a room mirror module for a vehicle according to one embodiment of the present invention.

The embodiments of the present invention that an ordinary person skilled in the art can implement will be described with reference to the accompanying drawings. The embodiments in the specification and the constructions shown in the drawings are provided as a preferred embodiment of the present invention, and it should be understood that there might be various equivalents and modifications which could substitute at the time of filing. In addition, when it comes to the operation principle of the preferred embodiments of the present invention, when the known functions or functions are seemed to make unclear the subject matters of the present invention, they will be omitted from the descriptions of the invention. The terms below are defined in consideration of the functions of the present invention, and the meaning of each term should be interpreted by judging the whole parts of the present specification, and the elements having the similar functions and operations of the drawings are given the same reference numerals.

The gist of embodiments of the present invention is to provide a room mirror module for a vehicle that can efficiently control a vehicle device by linking a photo sensor detecting an intensity of light with an MEMS sensor detecting movement of the vehicle, and can improve stability by obtaining image information resulting from a rotating direction of the vehicle and rotating a headlight according to the rotating direction of the vehicle.

FIG. 1 is a block diagram illustrating a configuration of a room mirror module for a vehicle according to one embodiment of the present invention.

Referring to FIG. 1, a room mirror for a vehicle 600 according to one embodiment of the present invention may include: a sensor unit 100 detecting an intensity of light and movement of the vehicle; an electrochromic mirror 300 which changes reflectance depending on the intensity of light; a display unit 200 outputting an image of the vehicle received from image input units 91, 92 and 93 mounted to an external part of the vehicle; and a control unit 400 driving devices for the vehicle by discriminating the intensity of light and the movement of the vehicle detected by the sensor unit 100.

The sensor unit 100 may include a photo sensor 110 and a movement sensing sensor 120. The photo sensor 110, which is a sensor detecting the intensity of light, may be composed of a glare sensor disposed in a mirror part of a room mirror and detecting the degree of glariness or an ambient light sensing sensor formed in an opposite side to the mirror part of the room mirror and detecting ambient light of the front of the vehicle without being limited to this. Here, the photo sensor 110 refers to including all image sensors such as a semiconductor and a camera sensor.

The movement sensing sensor 120, which is a sensor detecting movement of the vehicle, may be composed of an acceleration sensor, a gyro sensor, a gravity sensor and the like, or a combination thereof. A sensor group including the sensor will be hereinafter referred to as an MEMS (micro-electro-mechanical system) sensor.

The display unit 200 visually displays an image received from an image input unit mounted to an external part of the vehicle and is disposed in a partial area of a rear surface of the electrochromic mirror 300. The image input unit according to the present embodiment of the invention is defined as a concept including a module comprising various cameras.

With regard to the image outputted from the display unit 200, the display unit 200 may display a rear image received from a rear camera 90, and images received from a left front camera 92 and a right front camera 93 mounted around a headlight of the vehicle when these cameras are installed, thereby enabling a driver to secure the wide-field of view.

The electrochromic mirror (ECM) 300 may inhibit glariness due to a rear vehicle on the drive by adjusting reflectance depending on the intensity of light detected by the photo sensor. The structure thereto will be described in a section for explanation of FIG. 5.

By discriminating the intensity of light and the movement of the vehicle detected by the sensor unit 100 composed of the photo sensor and the MEMS sensor 120, the control unit 400 may control the electrochromic mirror 300 and the display unit 200 so that they can drive.

More specifically, as the photo sensor 110 performs day and night discrimination as an ambient light sensing sensor detecting ambient light of the front of the vehicle, when it is discriminated that it is daytime, the control unit 400 may inhibit the electrochromic mirror 300 from being operated by cutting off a power supply supplied to the electrochromic mirror 300. When it is discriminated that it is night-time, the control unit 400 may drive the electrochromic mirror 300. Also, as the photo sensor 110 catches the amount of light as the glare sensor detecting the degree of glariness due to light generated from a rear vehicle, the control unit may control the electrochromic mirror 300 that reflectance of the electrochromic mirror 300 can be controlled.

Moreover, when the MEMS sensor 120 detects the backing of the vehicle, the control unit 400 may drive the display unit 200 to display a rear image received from a rear camera 90 and may control an operation of the electrochromic mirror 300 to secure a driver's rear field of vision upon the backing of the vehicle.

In addition to this, when cameras are disposed at the left front and right front or a front surface and a side, when movement of the vehicle such as forward movement, right turn and left turn is detected by the MEMS sensor 120, the control unit 400 may also drive the display unit 200 to display a front image, a right front image, a left front image or a side image of the vehicle, and may control a headlight 80 in a turning direction of the vehicle at the time of the turning of the vehicle.

As such, by displaying the image depending on the movement of the vehicle and controlling the headlight to be rotated, the driver's field of vision can be wide, and the driver can rapidly and accurately respond to an unexpected situation or defensive driving, thereby inhibiting an accident from being generated in advance. Furthermore, by linking the photo sensor 110 with the MEMS sensor 120, the driving of the devices for the vehicle such as the electrochromic mirror 300, the display unit 200 and the like can be more efficiently controlled.

Figure 2:
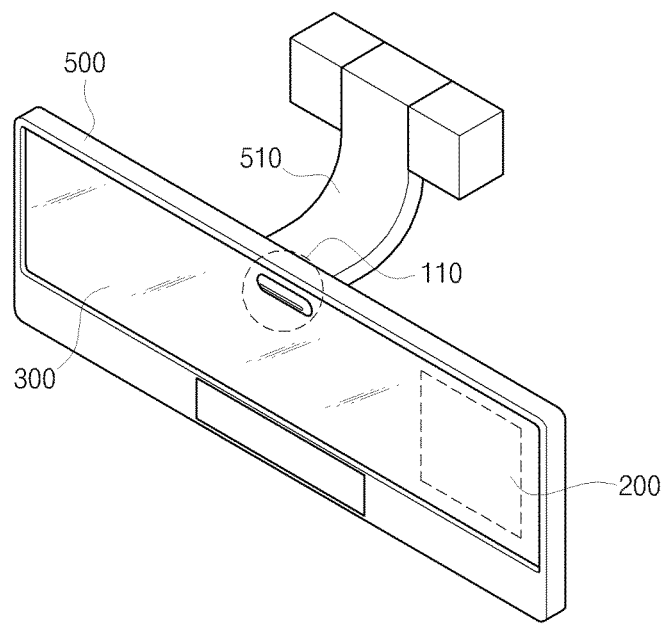
FIG. 2 is a view schematically illustrating a structure of the room mirror module for the vehicle according to the one embodiment of the present invention.

FIG. 2 is a view schematically illustrating a structure of the room mirror module for the vehicle according to the one embodiment of the present invention.

Referring to FIG. 2, the room mirror module for the vehicle according to the one embodiment of the present invention may include: the electrochromic mirror 300; a room mirror housing 500 in which the electrochromic mirror 300 is mounted on one surface; the photo sensor 110 detecting the intensity of light; the display unit 200 formed in the partial area of the rear surface of the electrochromic mirror 300; and the control unit 400 (not drawn) controlling the electrochromic mirror 300 and the display unit 200 by discriminating the intensity of light detected by the photo sensor 110 and the movement of the vehicle detected by the MEMS sensor 120 (not drawn), and may further include a fixing member 510 fixing the room mirror housing 500 to a frontal glass part of the vehicle.

The photo sensor 110 may be a glare sensor detecting the degree of glariness due to light generated from a rear vehicle. In this case, as the amount of light is catched by the glare sensor, reflectance of the electrochromic mirror 300 may be controlled by the control unit 400. Also, even though it is not illustrated in the drawings, an ambient light sensing sensor detecting ambient light of the front of the vehicle is mounted to the rear surface of the room mirror housing 500, namely, a housing surface toward the front of the vehicle so as to perform day and night discrimination or to discriminate the intensity of light, thereby enabling an operation of the electrochromic mirror 300 to be controlled by the control unit 400.

Figure 3:
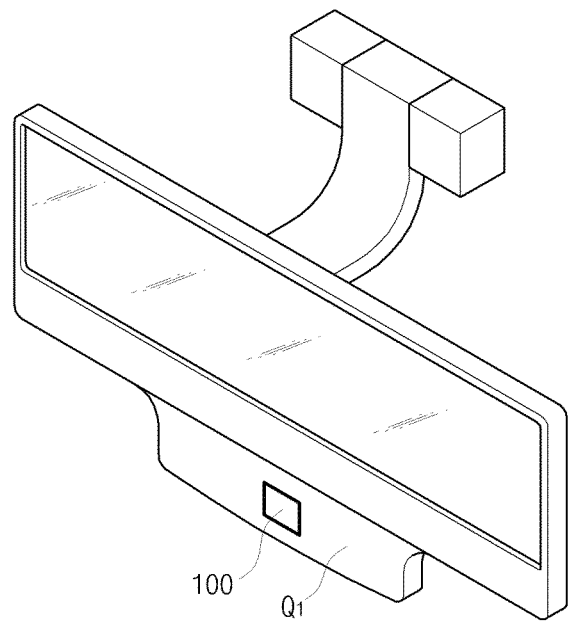
FIG. 3 and FIG. 4 are views illustrating a mounting structure of a sensing unit according to another embodiment of the present invention.
Figure 4:
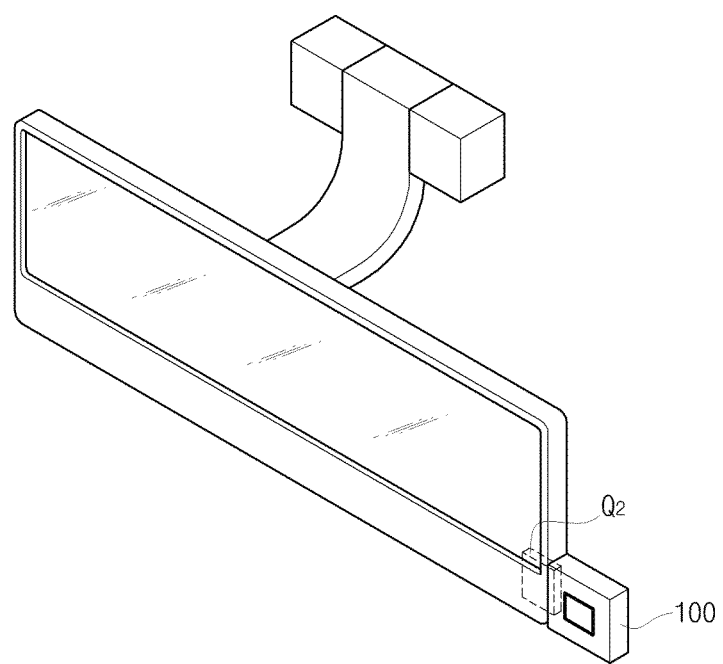

At this time, the photo sensor 110 may be mounted in an internal part of the room mirror housing 500 as shown in FIG. 2, and may be also mounted in the internal part of the room mirror housing 500 in a state of being mounted to the same sensor board as the MEMS sensor 120. Furthermore, as shown in FIG. 3 and FIG. 4, the photo sensor 110 and the MEMS sensor 120 mounted to the same sensor board, namely, the sensor unit 100, may be separately mounted to an external part of the room mirror housing 500. The position where the sensor unit is mounted is not limited to the positions illustrated in the drawings. The sensor unit 100 may be mounted at most places of the external part of the room mirror housing 500 within a range without being disturbed in sensing light.

Also, the photo sensor 110 may be mounted to the external part of the room mirror housing 500, and the MEMS sensor 120 may be mounted to the internal part of the room mirror housing 500. On the contrary to this, the photo sensor 110 may be mounted to the internal of the room mirror housing 150, and the MEMS sensor 120 may be mounted to the external part of the room mirror housing 150.

The display unit 200 is disposed in the partial area of the rear surface of the electrochromic mirror 300. The position where the display unit 200 is disposed is not limited to the position illustrated in the drawing, and could be appropriately designed and changed. In this case, a part corresponding to the display unit 200 may be composed of a half mirror having a reflection property as well as a transmission property of light.

Thus, when the display unit 200 operates, the half mirror enables the driver to see an image displayed in the display unit 200 thanks to its transmission property, and when the display unit 200 does not operate, the half mirror may be used as a mirror by its reflection property.

FIG. 3 and FIG. 4 are views illustrating a mounting structure of a sensing unit according to another embodiment of the present invention.

Referring to FIG. 2 to FIG. 4, unlike the example as described in the section for the explanation of FIG. 2 which is configured such that the sensing unit 100 is inserted into the internal part of the room mirror housing 500, the sensing unit may be implemented in a structure in which, as a separate structure, the sensing unit is formed and mounted to be independent from the room mirror housing 500.

For example, after a mounting unit Q1, which may be mounted to the external part of the room mirror housing 500, is formed, the sensing unit 100 may be mounted to the mounting unit Q1. Alternately, after an insertion unit Q2, which may insert the sensing unit 100 into the room mirror housing 500 itself, is formed, the sensing unit 100 may be inserted into the insertion unit Q2. Of course, the position of the insertion unit Q2 or the position of the mounting unit Q1 may be variously changed and implemented. The insertion unit or the mounting unit may be also implemented so as to be electrically connected to the control unit 400 of the internal part of the room mirror housing 500.

Figure 5:
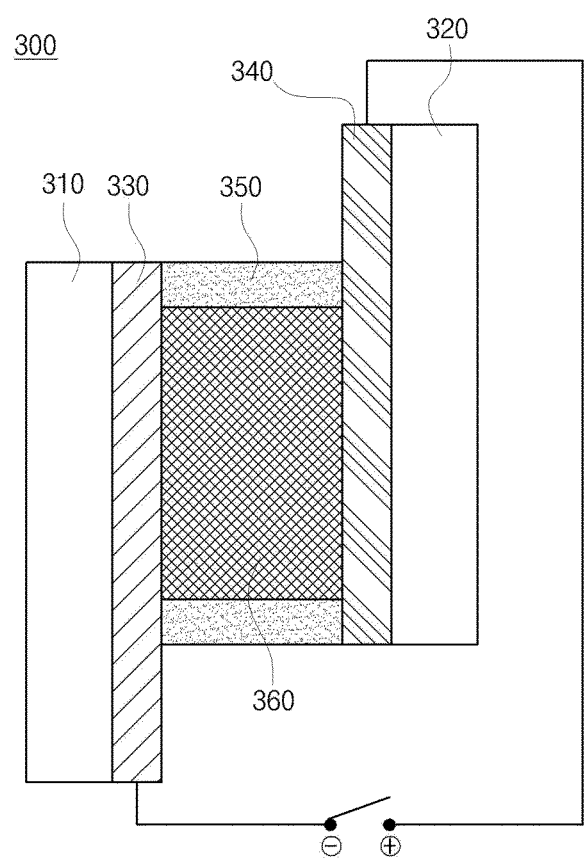
FIG. 5 is a view illustrating a schematic structure of an electrochromic mirror according to still another embodiment of the present invention.

FIG. 5 is a view illustrating a schematic structure of an electrochromic mirror according to still another embodiment of the present invention.

Referring to FIG. 5, the electrochromic mirror (ECM) 300 is configured such that a first substrate 310 and a second substrate 320 facing each other are disposed to be spaced apart from each other, a transparent electrode 330 and a reflective layer 340 are each formed on opposite surfaces to each other of the first substrate 310 and the second substrate 320, a space is formed between the transparent electrode 330 and the reflective layer 340 using a sealant 350, and a chromic material layer 360 is formed by injecting a chromic material and an electrolyte into the formed space.

An electrochromic material in which an optical characteristic of the material can be reversibly changed by an electrochemical oxidation-reduction reaction may be used in the electrochromic mirror 300. When an electrical signal is not applied from the outside, the electrochromic mirror 300 is not colored, and when an electrode signal is applied, it is colored, thereby controlling reflectivity of the room mirror.

At this time, a transparent electrode 330 may be composed of ITO (Indium doped Tin Oxide), ATO (Antimony doped Tin Oxide), FTO (Fluorine doped Tin Oxide), IZO (Indium doped Ainc Oxide) and the like. The electrochromic material may be an organic or inorganic electrochromic material. The organic electrochromic material may be composed of viologen, anthraquinone, polyaniline or polythiopene, and the inorganic electrochromic material may be $WO_3$, $MoO_3$, $CeO_3$, $MnO_2$, or $Nb_2O_5$. Also, more specifically, since the electrochromic material is a material having an electrochromic characteristic in which the absorptivity of light is changed by an electrochemical oxidation-reduction reaction, an electrochemical oxidation-reduction phenomenon of the electrochromic material may be reversibly generated depending on whether or not a voltage is applied, and intensity of the voltage, and thus transparency and the absorptivity of the electrochromic material may be reversibly changed. A metal oxide electrochromic material containing tungsten, iridium, nickel and vanadium, the organic electrochromic material containing viologen and quinone, a conductive polymer electrochromic material containing polythiophene, polyaniline and polypyrrole, and a derivant thereof may be applied as the electrochromic material. Specifically, the electrochromic material may be any one selected from the group consisting of polythiophene, polyaniline, polypyrrole, polyanthracene, polyfluorene, polycarbazole, polyphenylenevinylene, and a derivant thereof.

Also, the first substrate 310 and the second substrate 320 may be formed of a transparent substrate such as a glass substrate. Also, as the other example, any one of the first substrate and the second substrate may be configured by applying a flexible transparent film other than the transparent substrate such as the conventional glass substrate and the like. As the flexible transparent film is used in this transparent film structure, the electrochromic material and the electrolyte may be formed by a coating (laminating) method rather than a vacuum bonding method so that the efficiency of a process and the reduction of a production cost can be implemented, and an entire thickness and weight of the electrochromic mirror can be also reduced, thereby improving a degree of design freedom. The transparent film may be composed of any one of polyethylene terephthalate (PET), polycarbonate (PC), an acrylonitrile-butadiene-styrene (ABS) copolymer, polymethyl methacrylate (PMMA), polyethylene naphthalate (PEN), polyether sulfone (PES), a cyclic olefin copolymer (COC), a TAC (Triacetylcellulose) film, a polyvinyl alcohol (PVA) film, a polyimide (PI) film, and polystyrene (PS).

The reflective layer 340 may be formed on the second substrate 320, and may serve as a reflective plate reflecting light incident by passing through the chromic material layer and a counter electrode of the transparent electrode. The reflective layer may be composed of at least one metal selected from the group consisting of Cu, Au, Ag, Ni, Al, Cr, Ru, Re, Pb, Sn, In, and Zn, or an alloy containing these metals. However, this is only one example, and is not limited.

The chromic material layer of the electrochromic mirror according to the present embodiment of the invention may be in a liquid state or a solid state. When the chromic material layer is in the solid state, the chromic material layer may include an electrolyte layer and an electrochromic coating layer formed on one surface or both surfaces of the electrolyte layer. That is, the solid electrochromic coating layer may be formed at both sides of the liquid electrolyte layer, or only at one side of the liquid electrolyte layer. When the chromic material layer is in the liquid state, it fails to uniformly discolor, and in order for the chromic material layer to maintain a discoloration state, voltage should be continuously applied thereto, and thus high power consumption is required. However, when the chromic material layer is formed in the solid state, it can uniformly discolor and decolor. Furthermore, since the electrochromic material has a memory effect, the voltage can be applied only upon discoloration and decoloration, thereby reducing power consumption. Also, since an inverse voltage is applied upon decoloration, a decoloration reaction speed can be fast, and since the electrochomic material to which the coating method is applied is an inorganic or organic polymer, durability of the device can be improved.

The embodiments are disclosed in the drawings and the specification. The specific terms used herein are for the purpose of describing particular embodiments only and are not intended to be limiting of example embodiments. Thus, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

What is claimed is:

1. A room mirror module for a vehicle, comprising:
   a sensor unit that comprises a photo sensor detecting an intensity of light and a movement sensing sensor detecting movement of a vehicle;
   a display unit displaying an image received from an image input unit mounted to an external part of the vehicle;
   a control unit driving the display unit based upon a combination of results of both the detecting of the light intensity by the photo sensor and the detecting of movement of the vehicle by the movement sensing sensor; and
   an electrochromic mirror adjusting reflectance depending on the intensity of light detected by the photo sensor.

2. The room mirror module of claim 1, wherein the display unit is disposed in a partial area of a rear surface of the electrochromic mirror.

3. The room mirror module of claim 2, wherein the movement sensing sensor is an MEMS (micro-electro-mechanical system) sensor that comprises any one of an acceleration sensor, a gyro sensor, and a gravity sensor, or a combination formed of at least two of them.

4. The room mirror module of claim 2, further comprising a room mirror housing in which the electrochromic mirror is mounted on one surface.

5. The room mirror module of claim 3, wherein the control unit drives the display unit so as to display an image received from a rear camera mounted to a rear part of the vehicle when a backward state of the vehicle is detected by the MEMS sensor.

6. The room mirror module of claim 3, wherein the control unit drives the display unit so as to display images received from a left front camera mounted to a left front of the vehicle, and a right front camera mounted to a right front of the vehicle when a left turn and a right turn of the vehicle are detected by the MEMS sensor.

7. The room mirror module of claim 3, wherein the control unit drives a headlight to be rotated in a turning direction of the vehicle when turning of the vehicle is detected by the MEMS sensor.

8. The room mirror module of claim 3, wherein the control unit blocks an operation of the electrochromic mirror when a backward state of the vehicle is detected by the MEMS sensor.

9. The room mirror module of claim 4, wherein the sensor unit is mounted to an external part of the room mirror housing.

10. The room mirror module of claim 9, wherein the sensor unit further comprises a mounting unit Q1 in which the sensor unit is mounted to the external part of the room mirror housing.

11. The room mirror module of claim 9, wherein the sensor unit has an insertion unit Q2 which enables the sensor unit to be inserted into the room mirror housing.

12. The room mirror module of claim 4, wherein the photo sensor comprises a glare sensor disposed in a room mirror part of the room mirror module for the vehicle or an ambient light sensing sensor formed in an opposite side to a mirror surface of a room mirror.

13. The room mirror module of claim 4, wherein the electrochromic mirror comprises: a first substrate and a second substrate facing each other; a transparent electrode and a reflective layer each formed on opposite surfaces to each other of the first substrate and the second substrate; and a chromic material layer disposed between the transparent electrode and the reflective layer.

14. The room mirror module of claim 13, wherein the first substrate and the second substrate are substrates made of a transparent material.

15. The room mirror module of claim 14, wherein a transparent film material is applied to at least any one of the first substrate and the second substrate is.

16. The room mirror module of claim 15, wherein the transparent film material may be any one of polyethylene terephthalate (PET), polycarbonate (PC), an acrylonitrile-butadiene-styrene (ABS) copolymer, polymethyl methacrylate (PMMA), polyethylene naphthalate (PEN), polyether sulfone (PES), a cyclic olefin copolymer (COC), a TAC (Tri-acetylcellulose) film, a polyvinyl alcohol (PVA) film, a polyimide (PI) film, and polystyrene (PS).

17. The room mirror module of claim 14, wherein the chromic material layer is formed by mixing a liquid electrochromic material and an electrolyte.

18. The room mirror module of claim 14, wherein the chromic material layer comprises a solid electrochromic coating layer and a liquid electrolyte layer.

19. The room mirror module of claim 18, wherein the chromic material layer is configured such that the solid electrochromic coating layer is disposed on one surface or both surfaces of the electrolyte layer.

* * * * *